Patented July 14, 1942

2,289,638

UNITED STATES PATENT OFFICE 2,289,638

PRINTING INK

Donald Robert Erickson and Paul J. Thoma, Kalamazoo, Mich., assignors to Michigan Research Laboratories, Inc., Kalamazoo, Mich.

No Drawing. Application June 2, 1941,
Serial No. 396,292

11 Claims. (Cl. 260—32)

This invention relates to printing ink.
It has for its objects:
First, to provide a new and improved ink.
Second, to provide such an ink in which a solvent miscible with water and a binder insoluble in water but soluble in said solvent and in said solvent and a limited quantity of water, but not in said solvent and more than a limited quantity of water, are employed, so that the ink will have water tolerance and will remain open on the press during high humidity conditions but can be treated with water after printing to cause the binder at the surface of the film to separate from the solvent so as to prevent offset.
Third, to provide such an ink in which the binder separates from the solvent at the surface only of a printed film, permitting the remainder of the film to dry by penetration.
Other objects and advantages pertaining to details and economies will appear from the description to follow.
Our new and improved ink comprises a varnish comprising 50 to 60 parts by weight of diethylene glycol or some other liquid polyglycol and 40 to 50 parts by weight of a synthetic resin comprising a terpene hydrocarbon of the formula $C_{10}H_{16}$ modified by an alpha beta unsaturated organic polybasic acid such as fumaric or maleic acid. The terpene hydrocarbon may be alpha terpinene, beta terpinene, pinene, alpha pinene, beta pinene, dipentene, limonene, or terpinolene. Such a resin is described in United States Letters Patents No. 1,993,025 and No. 1,993,031.
This type of resin is sold under the trade name "Petrex Acid." It has a high acid number and a melting point high enough to resist melting when steam is applied to prevent offset.
The resin is soluble in diethylene glycol, but is insoluble in water. It is soluble in diethylene glycol with a limited quantity of water but is insoluble in diethylene glycol with more than a limited quantity of water.
We have found that very satisfactory results may be obtained with this resin with as low an acid number as 200, but the higher acid number resins are more satisfactory. The water tolerance of the ink varies with an increase in acid number, being greater for higher acid numbers.
We employ a pigment insoluble in the polyglycol or in water. 15 to 20% of the weight of the varnish of carbon black or 60% of the weight of the varnish of chrome yellow give satisfactory inks. Other pigments are used for other colors and the amounts will vary in different inks.
In use a film of ink is printed on a sheet of paper or the like. Immediately thereafter it is subjected to the action of dry steam or a fine spray of water which causes a film of the resin to form over the exposed portions of the printed film. This prevents offset. The ink beneath this thin film is not affected and may dry by penetration.
We have referred specifically to the use of diethylene glycol and other liquid polyglycols. These could include, of course, triethylene glycol, propylene glycol or dipropylene glycol.
The ink made in accordance with our invention has sufficient water tolerance so that it may be printed without setting up on the press. When the ink is treated with water after printing, as above set forth, the film of the resin formed on the surface is of sufficient thickness to prevent offset and to resist the action of the solvent in the film to prevent softening of the ink before it can dry by penetration.
The terms and expressions which have been herein employed are used as terms of description and not of limitation and there is no intention in the use of such terms and expressions of excluding any equivalents of the features shown and described. It is recognized that various modifications are possible within the scope of the invention claimed.
Having thus described our invention what we claim as new and desire to secure by Letters Patent is:
1. A non-offsetting printing ink comprising a varnish comprising a liquid polyglycol as a solvent for the resin, and a resin comprising a terpene hydrocarbon of the formula $C_{10}H_{16}$ modified with fumaric acid and having a high acid number and in sufficient amount to form, when subjected to steam immediately after printing, a thin hard film of resin over the exposed surfaces of the printed film, and pigment insoluble in water and in said polyglycol.
2. A non-offsetting printing ink comprising a varnish comprising a liquid polyglycol as a solvent for the resin, and a resin comprising a terpene hydrocarbon of the formula $C_{10}H_{16}$ modified with an alpha beta unsaturated organic polybasic acid and having a high acid number and in sufficient amount to form, when subjected to steam immediately after printing, a thin hard film of resin over the exposed surfaces of the printed film, and pigment insoluble in water and in said polyglycol.

3. A non-offsetting printing ink comprising a varnish comprising a liquid polyglycol as a solvent for the resin, and a resin comprising a terpene hydrocarbon of the formula $C_{10}H_{16}$ modified with an alpha beta unsaturated organic polybasic acid and in sufficient amount to form, when subjected to steam immediately after printing, a thin hard film of resin over the exposed surfaces of the printed film, and pigment insoluble in water and in said polyglycol.

4. A non-offsetting printing ink comprising a liquid polyglycol as a solvent for the resin, and a resin comprising a terpene hydrocarbon of the formula $C_{10}H_{16}$ modified with fumaric acid and as modified being soluble in said polyglycol and in a mixture of said polyglycol and a limited quantity of water but insoluble in a mixture of said polyglycol and an unlimited quantity of water and capable of forming a thin hard film and in sufficient amount to form, when subjected to steam immediately after printing, a thin hard film of resin over the exposed surfaces of the printed film, and a pigment insoluble in water and in said polyglycol.

5. A non-offsetting printing ink comprising a liquid polyglycol as a solvent for the resin and a resin comprising a terpene hydrocarbon of the formula $C_{10}H_{16}$ modified with an alpha beta unsaturated organic polybasic acid and as modified being soluble in said polyglycol and in a mixture of said polyglycol and a limited quantity of water but insoluble in a mixture of said polyglycol and an unlimited quantity of water and capable of forming a thin hard film and in sufficient amount to form, when subjected to steam immediately after printing, a thin hard film of resin over the exposed surfaces of the printed film, and a pigment insoluble in water and in said polyglycol.

6. A non-offsetting printing ink comprising a liquid polyglycol as a solvent for the resin and a resin comprising a terpene hydrocarbon of the formula $C_{10}H_{16}$ modified with fumaric acid and as modified being soluble in said polyglycol and in a mixture of said polyglycol and a limited quantity of water but insoluble in a mixture of said polyglycol and an unlimited quantity of water and capable of forming a thin hard film, and having a softening point above the temperature of ordinary steam and in sufficient amount to form, when subjected to steam immediately after printing, a thin hard film of resin over the exposed surfaces of the printed film, and pigment insoluble in water and in said polyglycol.

7. A non-offsetting printing ink comprising a liquid polyglycol as a solvent for the resin and a resin comprising a terpene hydrocarbon of the formula $C_{10}H_{16}$ modified with an alpha beta unsaturated organic polybasic acid and as modified being soluble in said polyglycol and in a mixture of said polyglycol and a limited quantity of water but insoluble in a mixture of said polyglycol and an unlimited quantity of water and capable of forming a thin hard film, and having a softening point above the temperature of ordinary steam and in sufficient amount to form, when subjected to steam immediately after printing, a thin hard film of resin over the exposed surfaces of the printed film, and pigment insoluble in water and in said polyglycol.

8. A non-offsetting printing ink comprising a varnish comprising a liquid polyglycol as a solvent for the resin and a resin comprising a terpene hydrocarbon of the formula $C_{10}H_{16}$ modified with an alpha beta unsaturated organic polybasic acid and having a high acid number, and having a softening point above the temperature of ordinary steam and in sufficient amount to form, when subjected to steam immediately after printing, a thin hard film of resin over the exposed surfaces of the printed film, and a pigment insoluble in water and in said polyglycol.

9. A non-offsetting printing ink comprising a varnish comprising a liquid polyglycol as a solvent for the resin, and a resin comprising a terpene hydrocarbon of the formula $C_{10}H_{16}$ modified with maleic acid and having a high acid number and in sufficient amount to form, when subjected to steam immediately after printing, a thin hard film of resin over the exposed surfaces of the printed film, and pigment insoluble in water and in said polyglycol.

10. A non-offsetting printing ink comprising a liquid polyglycol as a solvent for the resin, and a resin comprising a terpene hydrocarbon of the formula $C_{10}H_{16}$ modified with maleic acid and as modified being soluble in said polyglycol and in a mixture of said polyglycol and a limited quantity of water but insoluble in a mixture of said polyglycol and an unlimited quantity of water and capable of forming a thin hard film and in sufficient amount to form, when subjected to steam immediately after printing, a thin hard film of resin over the exposed surfaces of the printed film, and a pigment insoluble in water and in said polyglycol.

11. A non-offsetting printing ink comprising a liquid polyglycol as a solvent for the resin and a resin comprising a terpene hydrocarbon of the formula $C_{10}H_{16}$ modified with maleic acid and as modified being soluble in said polyglycol and in a mixture of said polyglycol and a limited quantity of water but insoluble in a mixture of said polyglycol and an unlimited quantity of water and capable of forming a thin hard film, and having a softening point above the temperature of ordinary steam and in sufficient amount to form, when subjected to steam immediately after printing, a thin hard film of resin over the exposed surfaces of the printed film, and pigment insoluble in water and in said polyglycol.

DONALD ROBERT ERICKSON.
PAUL J. THOMA.